United States Patent
Ghosh

(10) Patent No.: US 10,149,314 B2
(45) Date of Patent: Dec. 4, 2018

(54) CASCADED TRIGGER FRAME INDICATION

(71) Applicant: Intel IP Corporation, Santa Clara, CA (US)

(72) Inventor: Chittabrata Ghosh, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 268 days.

(21) Appl. No.: 14/867,863

(22) Filed: Sep. 28, 2015

(65) Prior Publication Data
US 2016/0227565 A1    Aug. 4, 2016

Related U.S. Application Data

(60) Provisional application No. 62/111,538, filed on Feb. 3, 2015.

(51) Int. Cl.
| | |
|---|---|
| *H04W 72/12* | (2009.01) |
| *H04L 5/00* | (2006.01) |
| *H04W 48/08* | (2009.01) |
| *H04W 84/12* | (2009.01) |

(52) U.S. Cl.
CPC ....... *H04W 72/1268* (2013.01); *H04L 5/0055* (2013.01); *H04W 48/08* (2013.01); *H04W 84/12* (2013.01)

(58) Field of Classification Search
CPC ...... H04L 5/0055; H04W 48/08; H04W 84/12
See application file for complete search history.

(56) References Cited

U.S. PATENT DOCUMENTS

| | | | |
|---|---|---|---|
| 8,526,346 B1 | 9/2013 | Liu | |
| 2010/0061346 A1 | 3/2010 | Wang et al. | |
| 2014/0334458 A1 | 11/2014 | Park | |
| 2016/0227533 A1* | 8/2016 | Josiam | H04W 74/006 |
| 2017/0279864 A1* | 9/2017 | Chun | H04L 65/4076 |

FOREIGN PATENT DOCUMENTS

| | | |
|---|---|---|
| WO | 2010013100 | 2/2010 |
| WO | 2013155990 | 10/2013 |

OTHER PUBLICATIONS

International Search Report and Written Opinion from PCT Application No. PCT/US2016/012605 dated Jun. 29, 2016. (13 pgs.).

* cited by examiner

*Primary Examiner* — Kent K Krueger
(74) *Attorney, Agent, or Firm* — Eversheds Sutherland (US) LLP

(57) ABSTRACT

This disclosure describes methods, apparatus, and systems related to cascaded trigger frame indication. A device may determine a beacon frame on a communication channel. The device may determine one or more trigger frames based at least in part on the beacon frame, the one or more trigger frames including at least in part a first trigger frame and a second trigger frame. The device may determine a cascade indication associated with the one or more trigger frames. The device may cause to send the beacon frame to one or more devices. The device may cause to send the first trigger frame to the one or more devices based at least in part on the beacon frame.

18 Claims, 8 Drawing Sheets

CASCADED TRIGGER FRAME INDICATION

CROSS-REFERENCE TO RELATED APPLICATIONS

This application claims the benefit of U.S. Provisional Application No. 62/111,538 filed Feb. 3, 2015 the disclosure of which is incorporated herein by reference as if set forth in full.

TECHNICAL FIELD

This disclosure generally relates to systems and methods for wireless communications and, more particularly, to scheduling medium access.

BACKGROUND

Wireless devices are becoming widely prevalent and are increasingly requesting access to wireless channels. A next generation WLAN, IEEE 802.11ax or High-Efficiency WLAN (HEW), is under development. HEW utilizes Orthogonal Frequency-Division Multiple Access (OFDMA) in channel allocation.

DETAILED DESCRIPTION

Figure 1:
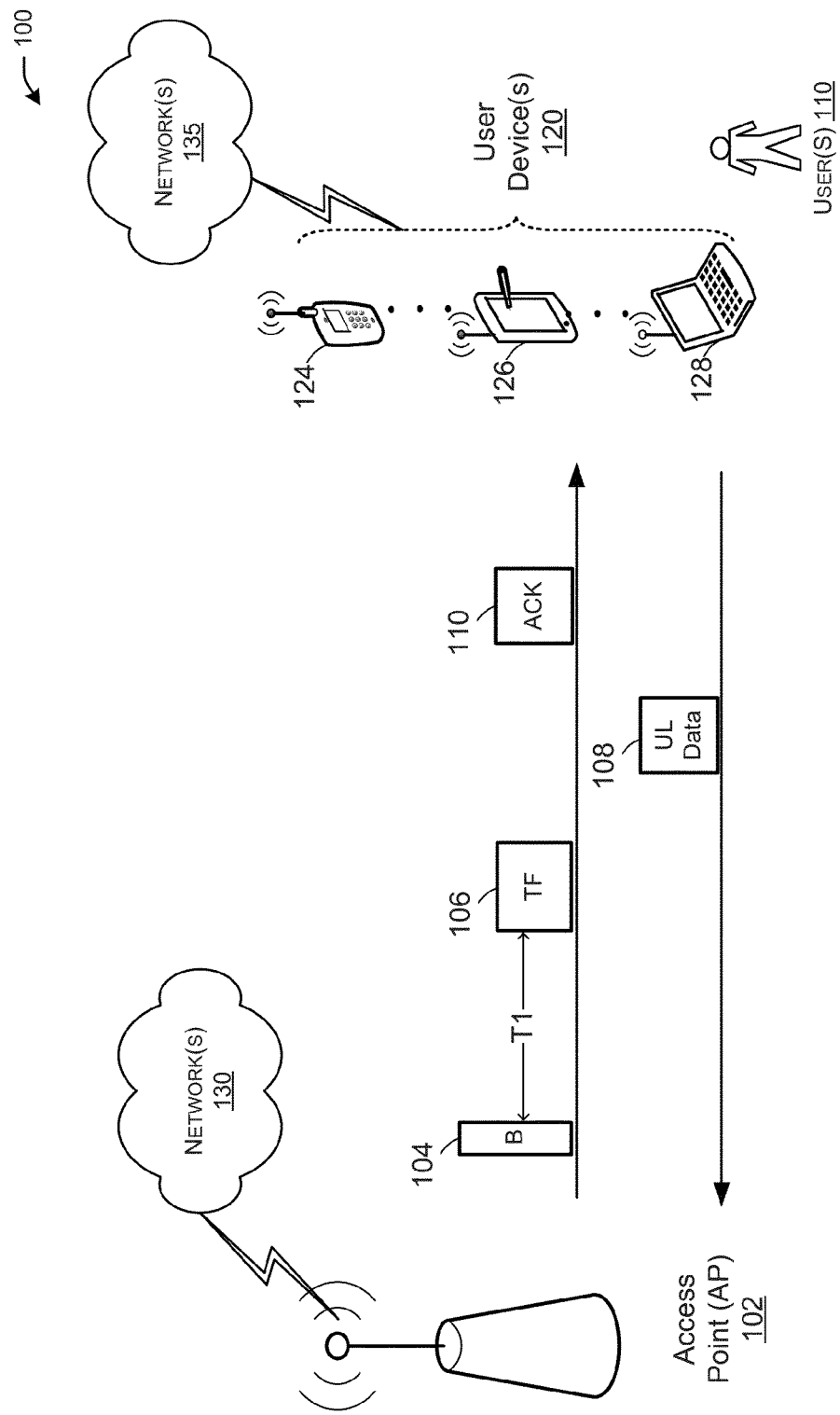
FIG. 1 depicts a network diagram illustrating an example network environment of an illustrative cascaded trigger frame indication, according to one or more example embodiments of the disclosure.

Example embodiments described herein provide certain systems, methods, and devices, for providing signaling information to Wi-Fi devices in various Wi-Fi networks, including, but not limited to, IEEE 802.11ax.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A design target for HEW is to adopt methods to improve the efficiency of Wi-Fi, and specifically the efficiency in dense deployments of Wi-Fi devices, such as in malls, conference halls, etc. HEW may use OFDMA techniques for channel access in the uplink and downlink directions. It is understood that the uplink direction is from a user device to an AP, and the downlink direction is from an AP to one or more user devices. In the uplink direction, one or more user devices may be communicating with the AP and may be competing for channel access in a random channel access manner. In that case, the channel access in OFDMA may require coordination among the various user devices that may be competing to access the operating channel simultaneously. A trigger frame may consist of a preamble along with other signaling, such as resource allocation, to coordinate the uplink OFDMA operation. A trigger frame may be a frame that contains a preamble and other fields that may be sent from an AP informing all user devices serviced by the AP that channel access is available. A trigger frame may be sent in a medium access control (MAC) layer or in a physical (PHY) layer.

In HEW, user devices may communicate with other user devices and/or APs in a scheduled or unscheduled (random) manner. In the scheduled manner, an AP may allocate and assign network resources to the user devices in order to transmit their data. In the alternative, user devices may randomly access the operating channel to transmit their data. Utilizing the trigger frame of HEW, the AP may send either a trigger frame indicating that one or more user devices are assigned scheduled resource units, or may send a random access trigger frame indicating that resource units are available in a random access manner, where user devices randomly select one or more resource units. The trigger frame may be associated with one or more resources units on an operating channel. When a user device detects the trigger frame, it may use one of the one or more resource units associated with the trigger frame to send its uplink data. In order for an AP to notify the one or more user devices serviced by that AP that a trigger frame is coming, the AP may send a beacon frame specifying the first scheduled trigger frame. It is understood that a beacon frame is one of the management frames in IEEE 802.11 based wireless local area networks (WLANs). It contains information about the network. Beacon frames may be transmitted periodically to announce the presence of a wireless LAN. Beacon frames are transmitted by the AP in an infrastructure basic service set (BSS).

An AP may send multiple trigger frames in one or more manners. The AP may schedule the trigger frames in an aperiodic cascaded sequence of trigger frames, periodic cascaded sequence of trigger frames, or random sequence of trigger frames. The aperiodic cascaded sequence of trigger frames may be where the AP sends the trigger frames one after the other in sequence. The periodic cascaded sequence of trigger frames may be where the AP sends the trigger frames at a specific time interval. The random sequence of trigger frames may be where the AP sends the trigger frames randomly between a first time period a second time period.

In some embodiments of the disclosure, an AP may define an indication within a trigger frame to determine whether the AP may be sending one or more trigger frames in any of the manners described above. The AP may define a cascade indication within, for example, a MAC header, or a PHY header of the trigger frame. For example, if a user device was unable to secure a resource unit from a previously received random access trigger frame, the user device may be able to determine when the next random access trigger frame and may contend for channel access again based on the information contained in the cascade indication.

FIG. 1 is a network diagram illustrating an example network environment, according to some example embodiments of the present disclosure. Wireless network 100 can include one or more computing devices 120 and one or more access point(s) (AP) 102, which may communicate in accordance with IEEE 802.11 communication standards, including IEEE 802.11ax. The computing device(s) 120 may be mobile devices that are non-stationary and do not have fixed locations. The one or more APs 102 may be stationary and have fixed locations.

Figure 6:
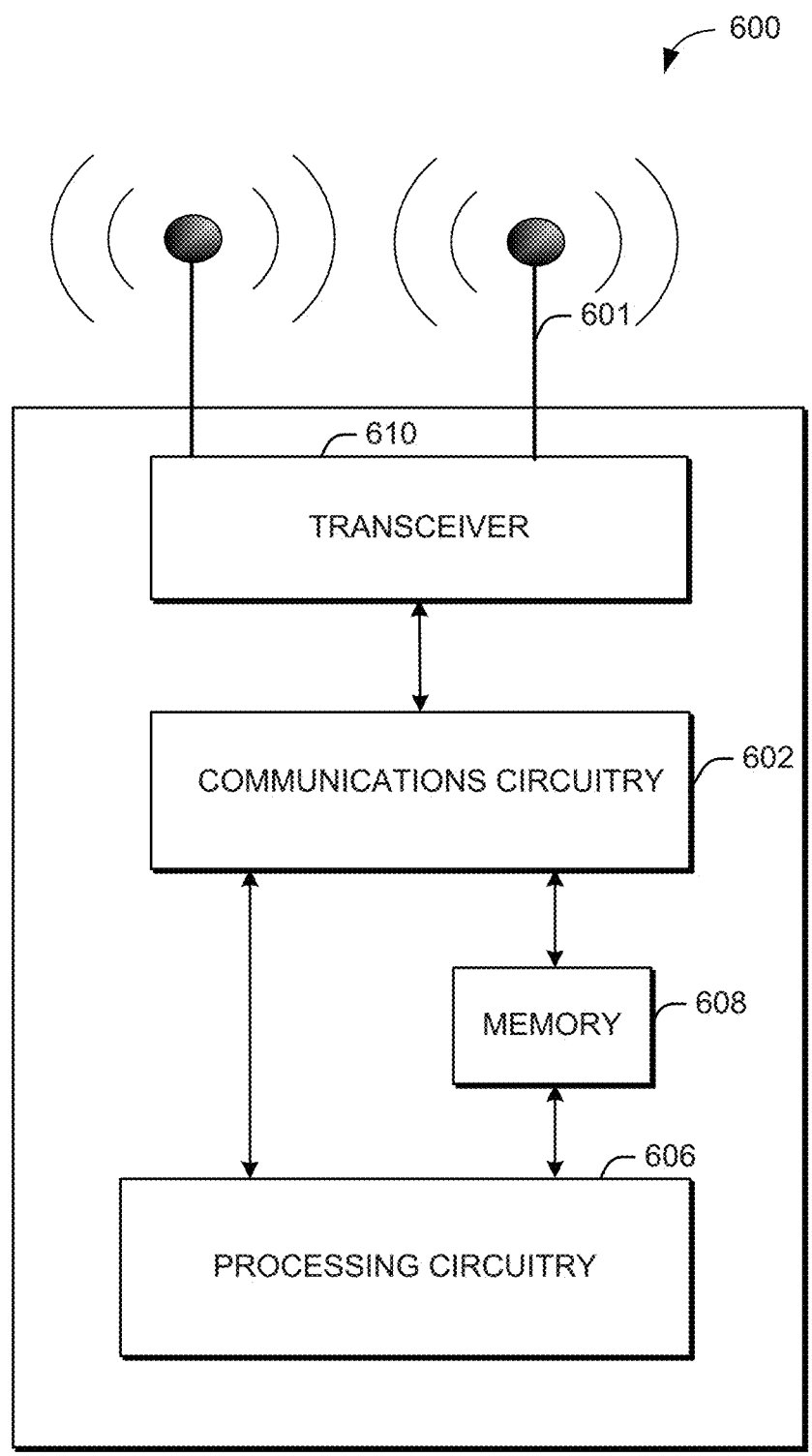
FIG. 6 illustrates a functional diagram of an example communication station that may be suitable for use as a user device, in accordance with one or more example embodiments of the disclosure.
Figure 7:
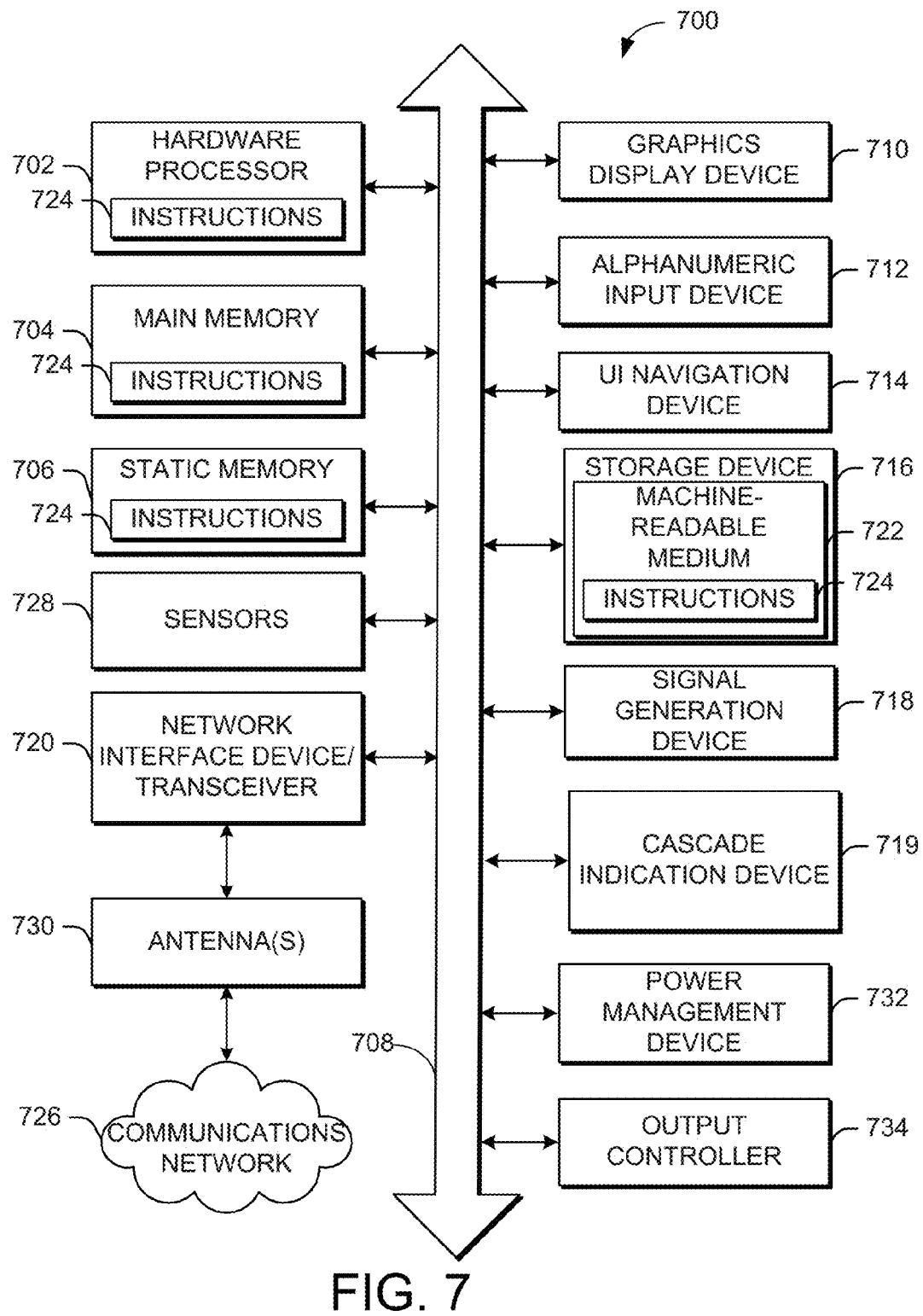
FIG. 7 is a block diagram of an example machine upon which any of one or more techniques (e.g., methods) may be performed, in accordance with one or more embodiments of the disclosure.

In some embodiments, the user devices 120 and AP 102 can include one or more computer systems similar to that of the functional diagram of FIG. 6 and/or the example machine/system of FIG. 7.

One or more illustrative user device(s) 120 may be operable by one or more users 110. The user device(s) 120 may include any suitable processor-driven user device including, but not limited to, a desktop computing device, a laptop computing device, a server, a router, a switch, a smartphone, a tablet, wearable wireless device (e.g., bracelet, watch, glasses, ring, etc.) and so forth.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennae. Communications antenna may be any suitable type of antenna corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

An AP may send a beacon frame to all the user devices it services. For example, AP 102, one or more user devices (e.g., user devices 124, 126 and 128), may send beacon 104. The beacon 104 may be used to notify the one or more user devices serviced by that AP that a trigger frame is coming. The beacon frame may contain various information including identification of the start time (e.g., time T1) of the first scheduled trigger frame. For example, at time T1, the AP 102 may send a trigger frame (e.g., TF 106) to one or more HEW devices (e.g., user devices 124, 126, 128) indicating that these devices are allowed to transmit their uplink data using one or more resources on an operating channel. The operating channel may be a channel that may be established between a user device and an access point. Trigger frame 106 may be a trigger frame identifying scheduled resource units or identifying random access resource units. The HEW devices having data to send to the access point may first wait until they detect the trigger frame (e.g., TF 106) before sending their uplink data. The user devices may determine whether they have been assigned a resource unit to transmit their data on the operating channel or whether they must compete for channel access.

In one embodiment, the trigger frame (e.g., trigger frame 106) may contain information related to whether the AP may be sending one or more sequences of trigger frames. For example, the AP may schedule one trigger frame containing one or more resource units, where the resource units may be utilized by one or more user devices to send their uplink data to the AP. When the AP receives the uplink data from the one or more user devices, the AP may send an acknowledgment in response to the received uplink data. The AP may send another trigger frame after the knowledge meant is sent out, and the cycle repeats. It would be beneficial for the user devices to know when the AP plans to send the next trigger frames. The cascade indication referenced in the trigger frame may notify the user devices if other trigger frames may be sent by the AP and when to expect these trigger frames. The cascade indication may also notify the user devices that no additional trigger frames may be sent by the AP. At least part of the cascade indication may be in the form of one or more bits set in the trigger frame that may be determined by the user devices that receive that trigger frame containing the cascade indication.

Figure 2:
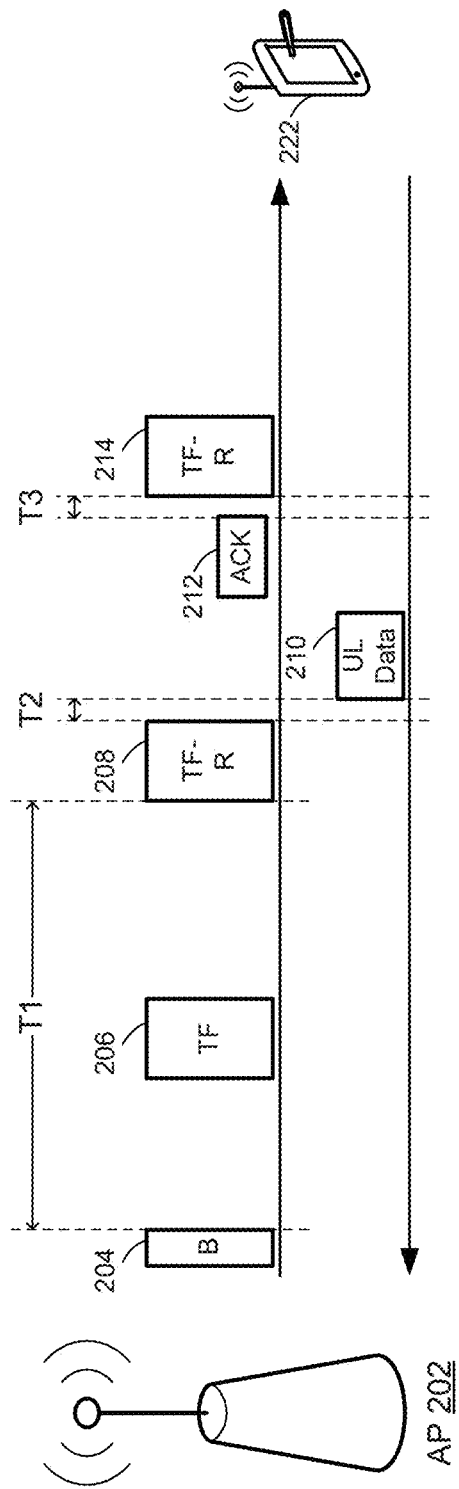
FIG. 2 depicts an illustrative schematic diagram of a cascaded trigger frame indication, in accordance with one or more example embodiments of the present disclosure.

FIG. 2 depicts an illustrative schematic diagram of a cascaded trigger frame indication, in accordance with one or more embodiments of the disclosure.

In conventional Carrier Sense Multiple Access with Collision Avoidance (CSMA/CA) protocol, user devices 120 may contend for the medium using a contention time window (CW) chosen from 0 to 31 in order to operate in a channel of entire 20 MHz or 40 MHz. However, in OFDMA, there may be a flexibility of allocating sub-channels (say, 2.5 MHz) instead of an entire channel. In that case, the user devices may have additional opportunities to access the communication channel with the AP. The AP may generate a beacon (e.g., beacon 204) and send it to one or more user devices serviced by that AP. The AP may generate a scheduling message (e.g., trigger frame 206) that may indicate the assigned sub-channels (e.g., resource units), and duration of access. The AP may also generate a trigger frame for random access (e.g., TF-R 208). The TF-R may be used to notify one or more user devices (e.g., user device 222) that resource units are available for contention based access (e.g., random access). The AP may transmit multiple trigger frames within a beacon interval and schedule one or more TF-Rs. The beacon frame may indicate when the first TF-R is scheduled. For example, the beacon frame may contain information about the start time (e.g., T1) of the first TF-R (e.g., TF-R 208). When the one or more user devices receive the beacon from the AP, the one or more user devices may be able to determine when to contend for the communication channel access. In some cases, such as a power save user device (e.g., user device 222), the user device may be placed in sleep mode until the time T1 has passed. User device 222 may "doze" or "sleep" between packets to save power, while the AP may buffer downlink frames. A time may be chosen for the user device to wake up and receive data packets to maximize power conservation. For example, user device 222 may enter in power-save mode, and from then on, the AP 102 stores all packets destined to the user device 222 in a per-user queue. It is understood that the above is only an example and that other power-save modes and techniques may be utilized.

User device 222 may wake up at the passage of T1 and may receive TF-R 208. User device 222 may then select a resource unit from the TF-R 208 to be used for transmitting its uplink data 210. Before sending any uplink data, a may delay transmission by a predetermined channel access delay (e.g., T2). The channel access delay T2 may be one of various durations; for example, inter space frames (IFS) that corresponds to an interval of time between the issuance of two frames. It is understood that IFS may have various types of intervals according to the various wireless standards. For example, according to the IEEE 802.11 standards, IFS may have three types: 1) short IFS (SIFS), which is the minimum time between the last symbol of a frame and the beginning of the first symbol of the next frame; 2) distributed coordination function IFS (DIFS), which may be used when a station wants to initiate a communication; and 3) point coordination function IFS (PIFS), which may be used by an access point (AP) to perform polling. The channel access delay T2 may be set automatically by the system or may be set by the administrator or by a user on the system. It is understood that the channel access delay T2 may follow communications standards, such as IEEE 802.11 standards and its various provisions, including HEW.

After a channel access delay T2 (e.g., SIFS, DIFS, PIFS, etc.) of detecting the TF-R transmission, user device 222 may transmit its uplink data 210. When AP 202 receives the uplink data 210, AP 202 may send an acknowledgement (e.g., ACK 212) to user device 222. After another channel access delay (e.g., T3), the AP may send another TF-R (e.g., TF-R 214) and the cycle repeats. Since the AP may schedule one or more T-FRs in various possible ways (e.g., aperiodic cascaded sequence, periodic cascaded sequence or random sequence of TF-Rs), the user device may rely on the information contained in the TF-Rs to determine when the next TF-R may be received. For example, AP 202 may determine the sequence of TF-Rs and determine a cascade indication, for example, setting one or more bits in the TF-R. The cascade indication may allow the user devices to determine the sequence of TF-Rs that may be sent from the AP. It is understood that the above are only examples of one user device attempting to access an operating channel and that other user devices may also attempt access to an operating channel.

Figure 3:
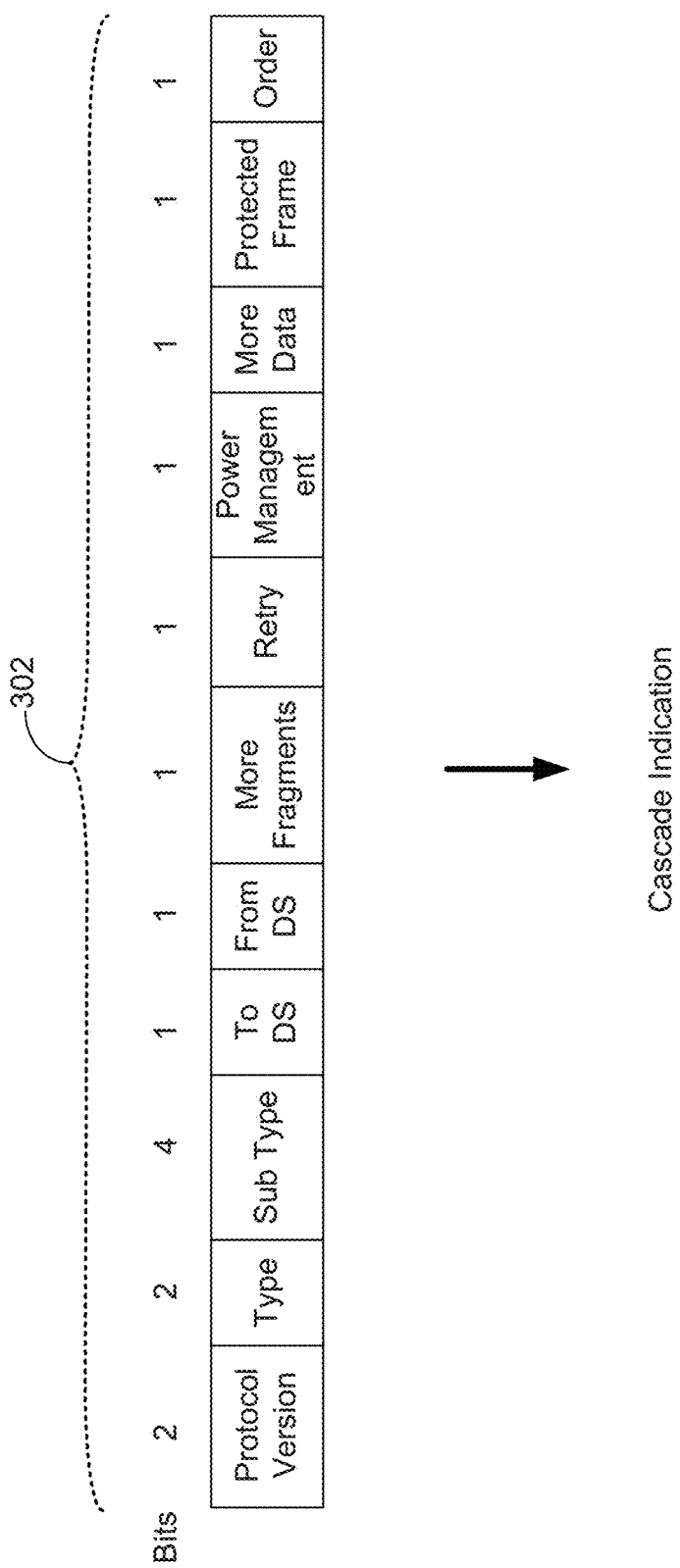
FIG. 3 depicts an example frame control field content for an illustrative cascaded trigger frame indication, in accordance with one or more embodiments of the disclosure.

FIG. 3 depicts an example cascade indication placed in a frame control (FC) 302 field in the MAC header of a TF or TF-R, in accordance with one or more embodiments of the disclosure. Although this example shows the cascade indication in the FC 302 field of a MAC header of a trigger frame, the cascade indication may be placed in a PHY header or any other headers of a trigger frame.

In one embodiment, the MAC header FC 302 field may include one or more fields that may be used to place the cascade indication. The one or more fields may be fields such as a type and sub-type subfields, more data field, or any other field contained within the trigger frame. The cascade indication may indicate the various types of trigger frames that an AP may allocate within a beacon interval. The cascade indication may determine whether a trigger frame is a TF-R that is cascaded, or non-cascaded. For example, assuming that the more data field of the FC 302 field contained the cascade indication, when a user device decodes that field, the user device may determine whether the TF-R that is cascaded or not. It is understood that other fields within a trigger frame may be used to place the cascade indication. The cascade indication may be an explicit indication of the schedule of TF-Rs expected to be transmitted by the AP. If any power save (PS) user device does not win channel access via contention in one TF-R, the cascade indication may assist the user device to wake up at a time for the next TF-R and contend for channel access again. It is understood that power save may allow a longer uptime for battery-powered user devices.

Figure 4:
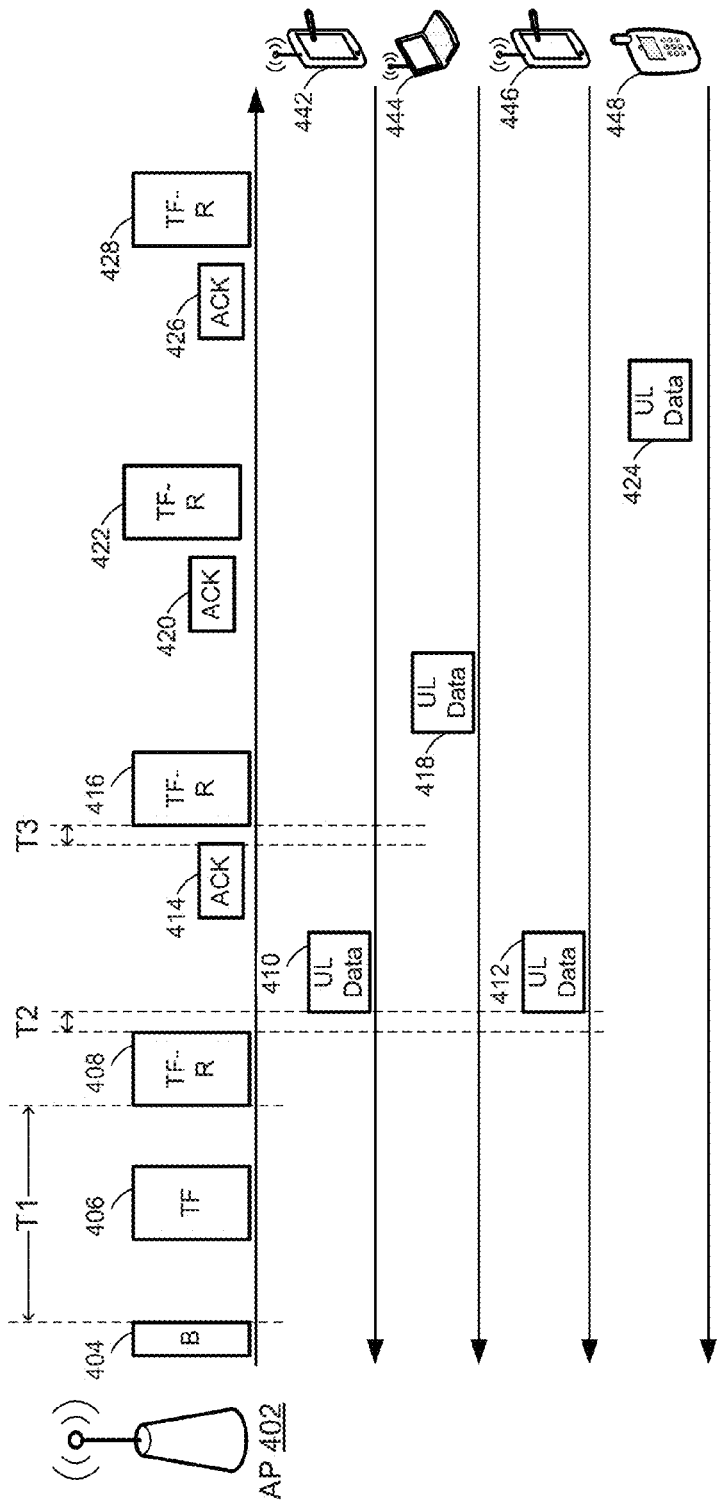
FIG. 4 depicts an illustrative schematic diagram of a cascaded trigger frame indication, in accordance with one or more example embodiments of the present disclosure.

FIG. 4 depicts an illustrative diagram of a cascaded sequence of TF-Rs using cascade indication, in accordance with one or more example embodiments of the present disclosure.

In one embodiment, when AP 402 sends beacon 404 to four user devices 442, 444, 446, and 448, the beacon 404 may contain a start time T1 of TF-R 408. In addition to cascaded TF-Rs, AP 402 may also send a trigger frame TF 406, which may include assigned resource units for the four user devices. TF-R 408 may contain one or more resource units that may be used by user devices 442, 444, 446, and 448 to transmit their uplink data 410, 412, 418, and 424. A cascade indication may be place in at least one of the TF-Rs. For example, the cascade indication may be placed in TF-R 408, where the cascade indication may determine the type of TF-R sequences (e.g., periodic cascaded sequence, periodic cascaded sequence, or random sequence of TF-Rs). Further, the cascade indication may also indicate whether the AP is scheduling another TF-R right after the end of a current interval of a current TF-R. An interval may be, for example, from the start of a TF-R until receiving the acknowledgement from one or more user devices. Referring to FIG. 4, the interval may be from the point of sending TF-R 408 until sending TF-R 416. The cascade indication may be one or more bits in a trigger frame. For example, if a bit of the cascade indication is set to 1, this may indicate that the current TF-R may be followed by another TF-R. In another example, if a bit of the cascade indication is set to 0, this may indicate that the current TF-R is the final one scheduled and the AP does not schedule another TF-R right after the end of the current interval triggered by the current TF-R. It is understood that the above are examples of a bit in a cascade indication and that other values may be envisioned to determine whether another TF-R may be sent or whether the sent TF-R was the final TF-R.

As shown in FIG. 4, four user devices 442, 444, 446, and 448, may be serviced by AP 402. In this example, user devices 442 and 446 may compete for channel access after receiving TF-R 408. In that case, they may transmit their UL data 410 and 412 in the current TF-R interval after a channel access delay T2. Additionally, in that interval, user devices 444 and 448 may not have won the channel access, but may have won access in second and third TF-Rs. In that case, user devices 444 and 448 may have received the cascade indication in TF-R 408 and determined that other TF-Rs will be transmitted by AP 402 at certain time interval. If user devices 444 and 448 were PS user devices, they would have woken up at the time the next TF-R would be received in order to compete for channel access. Otherwise, a user device may determine another cascade indication for the next TF-R to determine when the next TF-R may be sent out by AP 402.

Figure 5A:
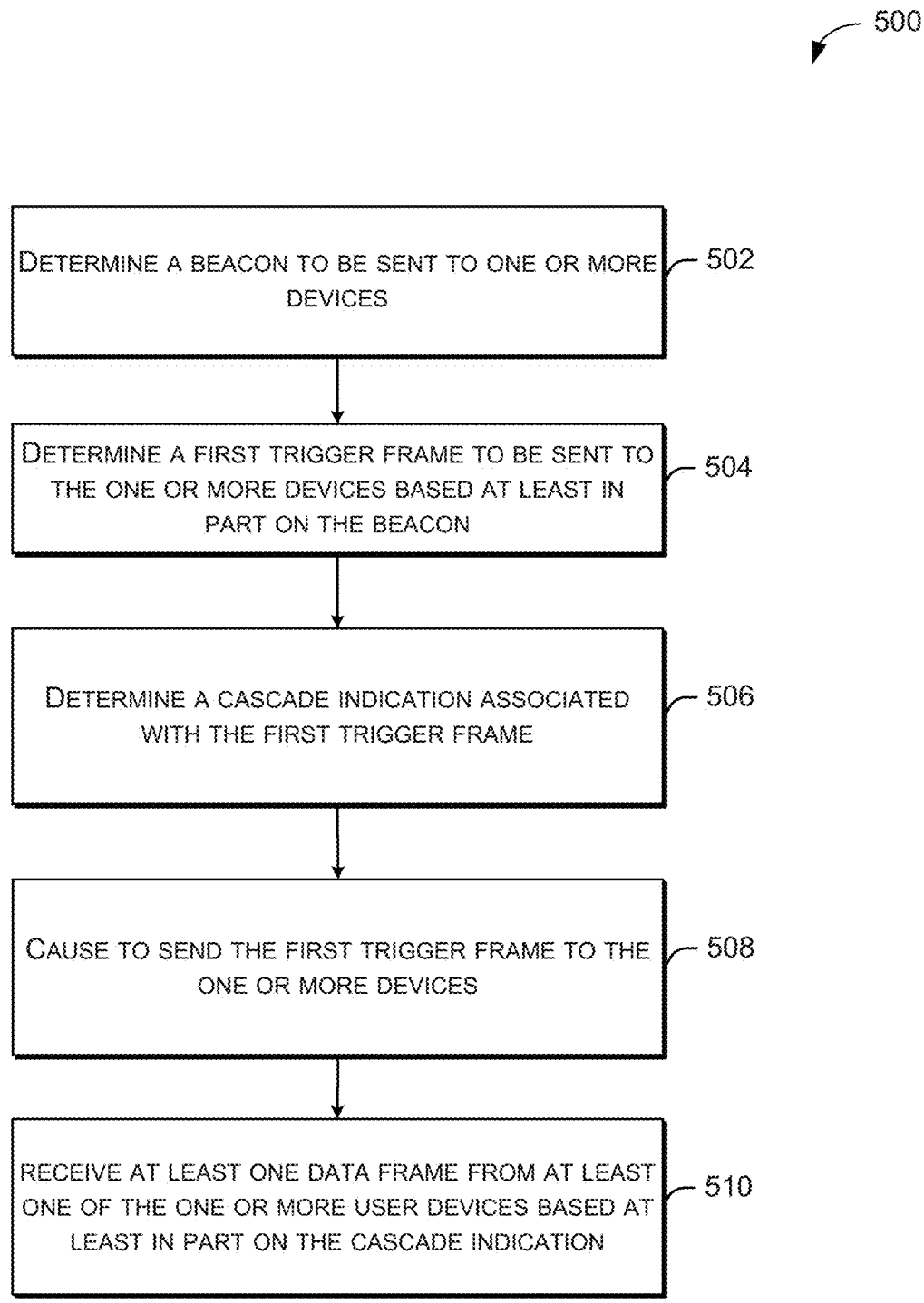
FIG. 5A depicts a flow diagram of an illustrative process for a cascaded trigger frame indication, in accordance with one or more embodiments of the disclosure.

FIG. 5A illustrates a flow diagram of illustrative process 500 for a cascaded trigger frame indication system in accordance with one or more embodiments of the disclosure.

At block 502, the AP may determine a beacon frame on a communication channel. In order for an AP to notify the one or more user devices serviced by that AP that a trigger frame is coming, the AP may send a beacon frame specifying the first scheduled trigger frame of one or more trigger frames. The beacon frame may contain various information including identification of the start time of the first random access trigger frame.

At block 504, the AP may determine one or more trigger frames based at least in part on the beacon frame, the one or more trigger frames including at least in part a first trigger frame and a second trigger frame. These trigger frames may be random access trigger frames and may contain one or more resource units, in addition to other information. For example, at the passage of a trigger frame start time, the AP may send a random access trigger frame to one or more user devices indicating that these devices are allowed to transmit their uplink data using one or more resources on an operating channel. The operating channel may be a channel that may be established between a user device and an access point. There may be more than one random access trigger frame being sent within the period of the beacon frame. The AP may send multiple trigger frames in one or more manners. The AP may schedule the trigger frames in an aperiodic cascaded sequence of trigger frames, periodic cascaded sequence of trigger frames, or random sequence of trigger frames. The aperiodic cascaded sequence of trigger frames may be where the AP sends the trigger frames one after the other in sequence. The periodic cascaded sequence of trigger frames may be where the AP sends the trigger frames at a specific time interval. The random sequence of trigger frames may be where the AP sends the trigger frames randomly between a first time period a second time period. The cascade indication may include at least in part a one bit indication, wherein a value of "1" indicates that a second trigger frame may be sent by the AP after a certain time from sending the first trigger frame. A value of "0" may indicate that the first trigger frame is a final trigger frame within a time interval of the beacon frame.

At block 506, the AP may determine a cascade indication associated with the one or more trigger frames. The cascade indication indicates to the one or more devices a sequence of the one or more trigger frames. For example, the cascade indication may indicate to a user device that other trigger frames may be sent by the AP and may indicate to the user device when the other trigger frames may be sent. Additionally, the cascade indication may indicate whether the received trigger frame is the final trigger frame during the period of the beacon frame.

At block 508, the AP may cause to send the beacon frame to one or more devices.

At block 510, the AP may send a trigger frame to the one or more devices based at least in part on the beacon frame. When the user device receive and select a resource unit from the trigger frame, the user device may send its data. The AP may then identify the uplink data frame from the user device. In response to receiving the uplink data frame, the AP may send an acknowledgment associated with the at least one uplink data frame to the user device.

Figure 5B:
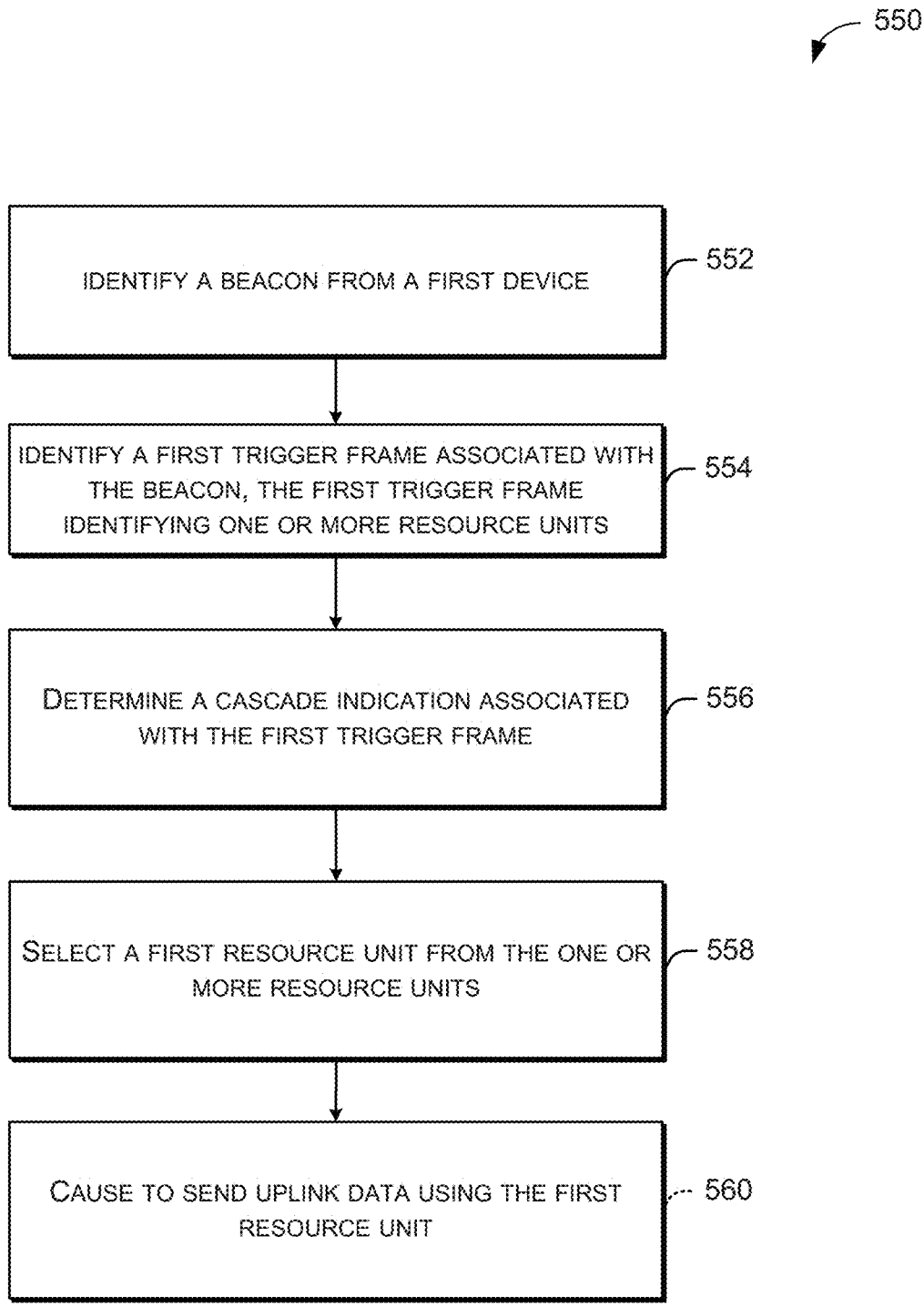
FIG. 5B depicts a flow diagram of an illustrative process for a cascaded trigger frame indication, in accordance with one or more embodiments of the disclosure.

FIG. 5B illustrates a flow diagram of illustrative process 550 for a cascaded trigger frame indication system in accordance with one or more embodiments of the disclosure.

At block 552, a user device may identify a beacon frame from a device (e.g. an AP) received on a communication channel. The beacon frame may specify the first scheduled trigger frame of one or more trigger frames that may be sent by the AP. The beacon frame may contain various information including identification of the start time of the first random access trigger frame.

At block 554, the user device may identify a first trigger frame of one or more trigger frames associated with the beacon frame. These trigger frames may be random access trigger frames and may contain one or more resource units, in addition to other information. For example, at the passage of a trigger frame start time, the AP may send a random access trigger frame to one or more user devices indicating that these devices are allowed to transmit their uplink data using one or more resources on an operating channel.

At block 556, the user device may determine a cascade indication associated with the one or more trigger frames that may be sent by the AP. There may be more than one random access trigger frame being sent within the period of the beacon frame. The AP may schedule the trigger frames in an aperiodic cascaded sequence of trigger frames, periodic cascaded sequence of trigger frames, or random sequence of trigger frames. The aperiodic cascaded sequence of trigger frames may be where the AP sends the trigger frames one after the other in sequence. The periodic cascaded sequence of trigger frames may be where the AP sends the trigger frames at a specific time interval. The random sequence of trigger frames may be where the AP sends the trigger frames randomly between a first time period a second time period. The cascade indication may include at least in part a one bit indication, wherein a value of "1" indicates that a second trigger frame may be sent by the AP after a certain time from sending the first trigger frame. A value of "0" may indicate that the first trigger frame is a final trigger frame within a time interval of the beacon frame.

At block 558, the user device may select a first resource unit from the one or more resource units. For example, when the user device receives a trigger frame containing one or more resource units, the user device may select at least one of these resource units in order to send its uplink data to the AP.

At block 560, the user device may send uplink data to the first device using the first resource unit. After selecting at least one of the resource units, the user device may send its uplink data on these resource units to the AP. When the AP receives the uplink data, the AP may send an acknowledgment that it did indeed receive the uplink data. The user device may identify the acknowledgment associated with the uplink data.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or communication station user device 120 (FIG. 1) in accordance with some embodiments. The communication station 600 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 2, 3, 4, 5A and 5B.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device may, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a cascaded trigger frame indication device 719, a network interface device/transceiver 720 coupled to antenna(s) 730, and one or more sensors 728, such as a global positioning system (GPS) sensor, compass, accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The cascaded trigger frame indication device 719 may be carry out or perform any of the operations and processes (e.g., processes 500 and 550) described and shown above. For example, the cascaded trigger frame indication device 719 may define an indication within a trigger frame to determine whether the AP may be sending one or more trigger frames in any of the manners described above. The AP may define a cascade indication within, for example, a MAC header, or a PHY header of the trigger frame. For example, if a user device was unable to secure a resource unit from a previously received random access trigger frame, the user device may be able to determine when to wake up in preparation for the next random access trigger frame and contend for channel access again based on the information contained in the cascade indication.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes (e.g., processes 400 and 500) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

According to example embodiments of the disclosure, there may be a device. The device may include at least one memory that stores computer-executable instructions, and at least one processor of the one or more processors configured to access the at least one memory, wherein the at least one processor of the one or more processors may be configured to execute the computer-executable instructions to determine a beacon frame on a communication channel. The at least one processor of the one or more processors may be configured to execute the computer-executable instructions to determine one or more trigger frames based at least in part on the beacon frame, the one or more trigger frames including at least in part a first trigger frame and a second trigger frame. The at least one processor of the one or more processors may be configured to execute the computer-executable instructions to determine a cascade indication associated with the one or more trigger frames. The at least one processor of the one or more processors may be configured to execute the computer-executable instructions to cause to send the beacon frame to one or more devices. The at least one processor of the one or more processors may be configured to execute the computer-executable instructions to cause to send the first trigger frame to the one or more devices based at least in part on the beacon frame.

The implementations may include one or more of the following features. The at least one processor of the one or more processors may be further configured to execute the computer-executable instructions to identify at least one uplink data frame from at least one of the one or more devices based at least in part on the cascade indication. The at least one processor of the one or more processors may be further configured to execute the computer-executable instructions to cause to send an acknowledgment associated with the at least one uplink data frame to the at least one of the one or more devices. The cascade indication indicates to the one or more devices a sequence of the one or more trigger frames. The sequence of the one or more trigger frames may be at least one of an aperiodic cascaded sequence of trigger frames, periodic cascaded sequence of trigger frames, or random sequence of trigger frames. The at least one processor of the one or more processors may be further configured to execute the computer-executable instructions to determine a start time of the first trigger frame based at least in part on the beacon frame. The cascade indication may include at least in part a one bit indication, wherein a value of "1" indicates that the second trigger frame to be sent after a first sequence of the sequence of the one or more trigger frames and wherein a value of "0" indicates that the first trigger frame may be a final trigger frame within a time interval of the beacon frame. The first trigger frame and the second trigger frames are random access trigger frames. The one or more trigger frames include one or more resource units associated with the communication channel. The device may further include a transceiver configured to transmit and receive wireless signals. The device may further include an antenna coupled to the transceiver. The device may further include one or more processors in communication with the transceiver.

According to example embodiments of the disclosure, there may be a non-transitory computer-readable medium storing computer-executable instructions which, when executed by a processor, cause the processor to perform operations. The operations may include identifying a beacon frame from a first device received on a communication channel. The operations may include identifying a first trigger frame of one or more trigger frames associated with the beacon frame. The operations may include determining a cascade indication associated with the one or more trigger frames. The operations may include selecting a first resource unit from the one or more resource units. The operations may include causing to send uplink data to the first device using the first resource unit.

The implementations may include one or more of the following features. The operations may include determining a start time of the first trigger frame based at least in part on the beacon frame received from the first device. The operations may include identifying an acknowledgment associated with the uplink data. The one or more trigger frames may include a second trigger frame. The first trigger frame and the second trigger frames may be random access trigger frames. The cascade indication may include at least in part a one bit indication, wherein a value of "1" indicates that the second trigger frame to be sent after a first sequence of the sequence of the one or more trigger frames and wherein a value of "0" indicates that the first trigger frame may be a final trigger frame within a time interval of the beacon frame. The cascade indication indicates to the one or more devices a sequence of the one or more trigger frames. The sequence of the one or more trigger frames may be at least one of an aperiodic cascaded sequence of trigger frames, periodic cascaded sequence of trigger frames, or random sequence of trigger frames.

According to example embodiments of the disclosure, there may be an apparatus. The apparatus may include means for determining a beacon frame on a communication channel. The apparatus may include means for determining one or more trigger frames based at least in part on the beacon frame, the one or more trigger frames including at least in part a first trigger frame and a second trigger frame. The apparatus may include means for determining a cascade indication associated with the one or more trigger frames. The apparatus may include means for causing to send the beacon frame to one or more devices. The apparatus may include means for causing to send the first trigger frame to the one or more devices based at least in part on the beacon frame.

The implementations may include one or more of the following features. The apparatus may further include means for identifying at least one uplink data frame from at least one of the one or more devices based at least in part on the cascade indication. The apparatus may include means for causing to send an acknowledgment associated with the at least one uplink data frame to the at least one of the one or more devices. The cascade indication indicates to the one or more devices a sequence of the one or more trigger frames. The sequence of the one or more trigger frames may be at least one of an aperiodic cascaded sequence of trigger frames, periodic cascaded sequence of trigger frames, or random sequence of trigger frames. The apparatus may further include means for determining a start time of the first trigger frame based at least in part on the beacon frame. The cascade indication may include at least in part a one bit indication, wherein a value of "1" indicates that the second trigger frame to be sent after a first sequence of the sequence of the one or more trigger frames and wherein a value of "0" indicates that the first trigger frame may be a final trigger frame within a time interval of the beacon frame. The first trigger frame and the second trigger frames are scheduled or random access trigger frames. The one or more trigger frames include one or more resource units associated with the communication channel.

According to example embodiments of the disclosure, there may be a method. The method may include determining a beacon frame on a communication channel The method may include determining one or more trigger frames based at least in part on the beacon frame, the one or more trigger frames including at least in part a first trigger frame and a second trigger frame. The method may include determining a cascade indication associated with the one or more trigger frames. The method may include causing to send the beacon frame to one or more devices The method may include causing to send the first trigger frame to the one or more devices based at least in part on the beacon frame.

The implementations may include one or more of the following features. The method may further include identifying at least one uplink data frame from at least one of the one or more devices based at least in part on the cascade indication. The method may include causing to send an acknowledgment associated with the at least one uplink data frame to the at least one of the one or more devices. A sequence of the one or more trigger frames may be at least one of an aperiodic cascaded sequence of trigger frames, periodic cascaded sequence of trigger frames, or random sequence of trigger frames. The sequence of the one or more trigger frames may be at least one of an aperiodic cascaded sequence of trigger frames, periodic cascaded sequence of trigger frames, or random sequence of trigger frames. The method further comprises determining a start time of the first trigger frame based at least in part on the beacon frame. The cascade indication may include at least in part a one bit indication, wherein a value of "1" indicates that the second trigger frame to be sent after a first sequence of the sequence of the one or more trigger frames and wherein a value of "0" indicates that the first trigger frame may be a final trigger frame within a time interval of the beacon frame. The first trigger frame and the second trigger frames are scheduled or random access trigger frames. The one or more trigger frames include one or more resource units associated with the communication channel.

According to example embodiments of the disclosure, there may be an apparatus. The apparatus may include means for identifying a beacon frame from a first device received on a communication channel. The apparatus may include means for identifying a first trigger frame of one or more trigger frames associated with the beacon frame. The apparatus may include means for determining a cascade indication associated with the one or more trigger frames. The apparatus may include means for selecting a first resource unit from the one or more resource units. The apparatus may include means for causing to send uplink data to the first device using the first resource unit.

The implementations may include one or more of the following features. The apparatus may further include means for determining a start time of the first trigger frame based at least in part on the beacon frame received from the first device. The apparatus may further include means for identifying an acknowledgment associated with the uplink data. The one or more trigger frames include a second trigger frame. The first trigger frame and the second trigger frames are scheduled or random access trigger frames. The cascade indication may include at least in part a one bit indication, wherein a value of "1" indicates that the second trigger frame to be sent after a first sequence of the sequence of the one or more trigger frames and wherein a value of "0" indicates that the first trigger frame may be a final trigger frame within a time interval of the beacon frame. The cascade indication indicates to the one or more devices a sequence of the one or more trigger frames. The sequence of the one or more trigger frames may be at least one of an aperiodic cascaded sequence of trigger frames, periodic cascaded sequence of trigger frames, or random sequence of trigger frames.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
   at least one memory that stores computer-executable instructions; and
   at least one processor of one or more processors configured to access the at least one memory, wherein the at least one processor of the one or more processors is configured to execute the computer-executable instructions to:
      determine a beacon frame on a communication channel;
      determine one or more trigger frames based at least in part on the beacon frame, the one or more trigger frames including at least in part a first trigger frame and a second trigger frame;
      determine a cascade indication to be included in the first trigger frame, wherein the cascade indication comprises a first value, and wherein the first value indicates to one or more devices a sequence of the one or more trigger frames;
      cause to send the beacon frame to the one or more devices; and
      cause to send the first trigger frame to the one or more devices based at least in part on the beacon frame.

2. The device of claim 1, wherein the at least one processor of the one or more processors is further configured to execute the computer-executable instructions to:
   identify at least one uplink data frame from at least one of the one or more devices based at least in part on the cascade indication; and
   cause to send an acknowledgment associated with the at least one uplink data frame to the at least one of the one or more devices.

3. The device of claim 1, wherein the sequence of the one or more trigger frames is at least one of an aperiodic cascaded sequence of trigger frames, periodic cascaded sequence of trigger frames, or random sequence of trigger frames.

4. The device of claim 1, wherein the at least one processor of the one or more processors is further configured to execute the computer-executable instructions to determine a start time of the first trigger frame based at least in part on the beacon frame.

5. The device of claim 1, wherein the cascade indication includes at least in part a one bit indication, wherein a value of "1" indicates that the second trigger frame to be sent after a first sequence of the sequence of the one or more trigger frames and wherein a value of "0" indicates that the first trigger frame is a final trigger frame within a time interval of the beacon frame.

6. The device of claim 1, wherein the first trigger frame and the second trigger frames are scheduled or random access trigger frames.

7. The device of claim 1, wherein the one or more trigger frames include one or more resource units associated with the communication channel.

8. The device of claim 1, further comprising:
   a transceiver configured to transmit and receive wireless signals;
   an antenna coupled to the transceiver; and
   one or more processors in communication with the transceiver.

9. A non-transitory computer-readable medium storing computer-executable instructions which when executed by one or more processors result in performing operations comprising:
   identifying a beacon frame from a first device received on a communication channel;
   identifying a first trigger frame of one or more trigger frames associated with the beacon frame;
   identifying a cascade indication included in the first trigger frame, wherein the cascade indication comprises a first value, and wherein the first value indicates to one or more devices a sequence of the one or more trigger frames;
   selecting a first resource unit from the one or more resource units; and
   causing to send uplink data to the first device using the first resource unit.

10. The non-transitory computer-readable medium of claim 9, wherein the computer-executable instructions cause the processor to further perform operations comprising determining a start time of the first trigger frame based at least in part on the beacon frame received from the first device.

11. The non-transitory computer-readable medium of claim 9, wherein the computer-executable instructions cause the processor to further perform operations comprising identifying an acknowledgment associated with the uplink data.

12. The non-transitory computer-readable medium of claim 9, wherein the one or more trigger frames include a second trigger frame.

13. The non-transitory computer-readable medium of claim 12, wherein the first trigger frame and the second trigger frames are scheduled or random access trigger frames.

14. The non-transitory computer-readable medium of claim 12, wherein the cascade indication includes at least in part a one bit indication, wherein a value of "1" indicates that the second trigger frame to be sent after a first sequence of the sequence of the one or more trigger frames and wherein a value of "0" indicates that the first trigger frame is a final trigger frame within a time interval of the beacon frame.

15. The non-transitory computer-readable medium of claim 9, wherein the sequence of the one or more trigger frames is at least one of an aperiodic cascaded sequence of trigger frames, periodic cascaded sequence of trigger frames, or random sequence of trigger frames.

16. A method comprising:
   determining a beacon frame on a communication channel;
   determining one or more trigger frames based at least in part on the beacon frame, the one or more trigger frames including at least in part a first trigger frame and a second trigger frame;
   determining a cascade indication to be included in the first trigger frame, wherein the cascade indication comprises a first value, and wherein the first value indicates to one or more devices a sequence of the one or more trigger frames;
   causing to send the beacon frame to the one or more devices; and causing to send the first trigger frame to the one or more devices based at least in part on the beacon frame.

17. The method of claim 16, further including:
identifying at least one uplink data frame from at least one of the one or more devices based at least in part on the cascade indication; and
causing to send an acknowledgment associated with the at least one uplink data frame to the at least one of the one or more devices.

18. The method of claim 16, wherein the sequence of the one or more trigger frames is at least one of an aperiodic cascaded sequence of trigger frames, periodic cascaded sequence of trigger frames, or random sequence of trigger frames.

* * * * *